US007878295B2

(12) United States Patent
Kato et al.

(10) Patent No.: US 7,878,295 B2
(45) Date of Patent: Feb. 1, 2011

(54) VEHICLE STEERING APPARATUS

(75) Inventors: Hiroaki Kato, Hekinan (JP); Satoru Mikamo, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 373 days.

(21) Appl. No.: 12/177,239

(22) Filed: Jul. 22, 2008

(65) Prior Publication Data
US 2009/0026003 A1    Jan. 29, 2009

(30) Foreign Application Priority Data
Jul. 23, 2007    (JP)    ............................. 2007-191216

(51) Int. Cl.
*B62D 5/04*    (2006.01)
*B62D 6/00*    (2006.01)
(52) U.S. Cl. ........................................ 180/446; 701/41
(58) Field of Classification Search ................. 180/446; 701/41
See application file for complete search history.

(56) References Cited

U.S. PATENT DOCUMENTS

| | | | |
|---|---|---|---|
| 6,665,598 B2 * | 12/2003 | Nakano et al. | ................. 701/41 |
| 6,931,313 B2 * | 8/2005 | Kato et al. | ..................... 701/41 |
| 7,426,428 B2 * | 9/2008 | Kato | ............................ 701/41 |
| 7,739,001 B2 * | 6/2010 | Kato et al. | ..................... 701/2 |
| 2004/0199316 A1 * | 10/2004 | Kato et al. | ..................... 701/41 |
| 2005/0049769 A1 | 3/2005 | Tsuchiya | |
| 2005/0216155 A1 * | 9/2005 | Kato et al. | ..................... 701/41 |
| 2005/0225864 A1 | 10/2005 | Kornrumpf et al. | |
| 2005/0228564 A1 | 10/2005 | Kato et al. | |
| 2006/0069481 A1 * | 3/2006 | Kubota et al. | ................. 701/41 |
| 2007/0100524 A1 * | 5/2007 | Sakaguchi et al. | ............ 701/41 |
| 2009/0024280 A1 * | 1/2009 | Kato et al. | ..................... 701/41 |
| 2009/0030573 A1 * | 1/2009 | Mikamo et al. | ................ 701/41 |

FOREIGN PATENT DOCUMENTS

| | | |
|---|---|---|
| DE | 103 25 587 A1 | 1/2004 |
| EP | 1731408 A1 * | 12/2006 |
| JP | 2004-9857 | 1/2004 |
| JP | 2005-297719 | 10/2005 |

OTHER PUBLICATIONS

U.S. Appl. No. 12/174,873, filed Jul. 17, 2008, Kato et al.
U.S. Appl. No. 12/178,117, filed Jul. 23, 2008, Mikamo et al.

* cited by examiner

*Primary Examiner*—Lesley Morris
*Assistant Examiner*—Daniel Yeagley
(74) *Attorney, Agent, or Firm*—Oblon, Spivak, McClelland, Maier & Neustadt, L.L.P.

(57) ABSTRACT

A vehicle steering apparatus 1 includes an EPS actuator 17 and an EPS ECU 18 that controls the EPS actuator 17. The EPS actuator 17 applies an assist force that assists a steering operation. A microcomputer 43 of the EPS ECU 18 determines whether the currently executed oversteer control (OS control) is being intensified or converged. In the OS control intensification state, in which the vehicle stability is low, the microcomputer 43 reduces a damper compensation current command Idp* (Idp**), which is a damper compensation component for attenuating a steering wheel turning speed ωs.

11 Claims, 7 Drawing Sheets

VEHICLE STEERING APPARATUS

CROSS-REFERENCE TO RELATED APPLICATIONS

This application is based upon and claims the benefit of priority from prior Japanese Patent Application No. 2007-191216, filed on Jul. 23, 2007, the entire contents of which are incorporated herein by reference.

BACKGROUND OF THE INVENTION

The present invention relates to a vehicle steering apparatus, and more specifically to a vehicle steering apparatus provided with a steering force assist device.

A typical vehicle steering apparatus includes a steering force assist device that applies to a steering system an assist force for assisting steering operation. An electric power steering apparatus (EPS actuator) using a motor as a drive source has been known as a steering force assist device. The steering force assist device typically executes damper compensation control based on the steering wheel turning speed, thereby improving the steering characteristic. This primarily suppresses excessive steering angle at high speed driving.

In a state of a low vehicle stability, for example, when the vehicle is traveling on a low μ road, an attempt is made to stabilize the attitude of the vehicle by performing a steering operation for applying a steering angle in a direction opposite to the direction of the yaw moment of the vehicle, that is, quick countersteering.

However, the damper compensation control is designed to attenuate the steering wheel turning speed. In other words, the damper compensation control hampers quick steering operation. Thus, quick steering operation at countersteering is influenced by the damper compensation control. Particularly, in the case of the vehicle steering apparatus (refer to Japanese Laid-Open Patent Publication No. 2005-297719), which is provided with a variable transmission ratio device, steering operation is influenced not only by the attenuation of the assist force due to the damper compensation control, but also by a reaction force torque accompanying the actuation of the variable transmission ratio device. This deteriorates the steering feel of the driver, and may hamper an appropriate countersteering by the driver.

SUMMARY OF THE INVENTION

Accordingly, it is an objective of the present invention to provide a vehicle steering apparatus that ensures a favorable steering feel, and enables an appropriate countersteering in accordance with the stability of a vehicle.

To achieve the foregoing objective and in accordance with one aspect of the present invention, a vehicle steering apparatus for changing an angle of a steered wheel of a vehicle steering system in accordance with operation of a steering wheel by a driver is provided. The steering apparatus includes a steering force assist device, a control means, and a stability determination means. The steering force assist device applies an assist force to the steering system to assist the operation of the steering wheel. The control means controls the steering force assist device with a target assist force. The control means calculates a basic assist component for controlling the steering force assist device. The control means calculates a damper compensation component based on a turning speed of the steering wheel. The control means calculates the target assist force by superimposing the basic assist component on the damper compensation component. The stability determination means determines a stability of the vehicle. The control means reduces the damper compensation component to correct the target assist force when the stability determination means determines that the stability of the vehicle is relatively low.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A vehicle steering apparatus 1 provided with a steering force assist device and a variable transmission ratio device according to one embodiment of the present invention will now be described with reference to drawings.

Figure 1:
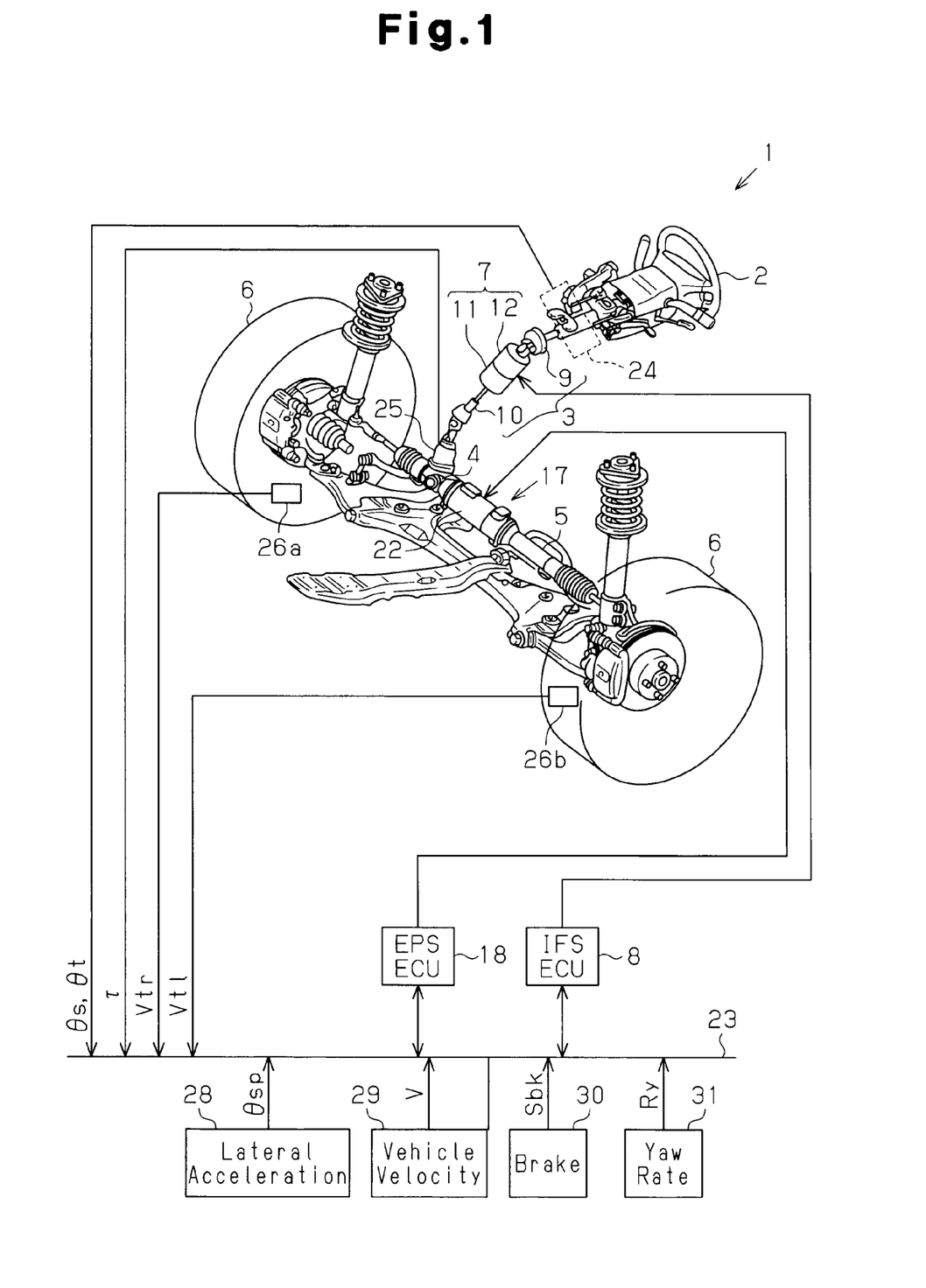
FIG. 1 is a schematic diagram showing the structure of a steering apparatus according to a preferred embodiment of the present invention.

FIG. 1 is a schematic diagram showing the structure of the steering apparatus 1 according to the preferred embodiment. As shown in the drawing, a steering shaft 3 to which a steering wheel 2 is fixed is coupled to a rack 5 via a rack and pinion mechanism 4. Rotation of the steering shaft 3 accompanying a steering operation is converted to a reciprocating linear motion of the rack 5 by the rack and pinion mechanism 4. The reciprocating linear motion of the rack 5 changes the steering angle of the steered wheels 6, or the tire angle, thereby changing the traveling direction of the vehicle.

The vehicle steering apparatus 1 includes a variable gear ratio actuator 7 and an IFS ECU (Intelligent Front Steering Electronic Control Unit) 8. The variable gear ratio actuator 7 functions as a variable transmission ratio device that varies the transmission ratio (gear ratio) of the steered wheels 6 to the turning angle of the steering wheel 2. The IFS ECU 8 controls actuation of the variable gear ratio actuator 7.

Specifically, the steering shaft 3 has a first shaft 9 and a second shaft 10. The steering wheel 2 is coupled to the first shaft 9. The second shaft 10 is coupled to the rack and pinion mechanism 4. The variable gear ratio actuator 7 includes a differential mechanism 11 and a motor 12. The differential mechanism 11 connects the first shaft 9 and the second shaft 10 to each other. The motor 12 drives the differential mechanism 11. The variable gear ratio actuator 7 adds rotation generated by driving the motor 12 to the rotation of the first shaft 9 accompanying the steering operation, and transmits the resultant rotation to the second shaft 10. In this manner, the variable gear ratio actuator 7 accelerates (or decelerates) the rotation of the steering shaft 3 transmitted to the rack and pinion mechanism 4.

Figure 2:
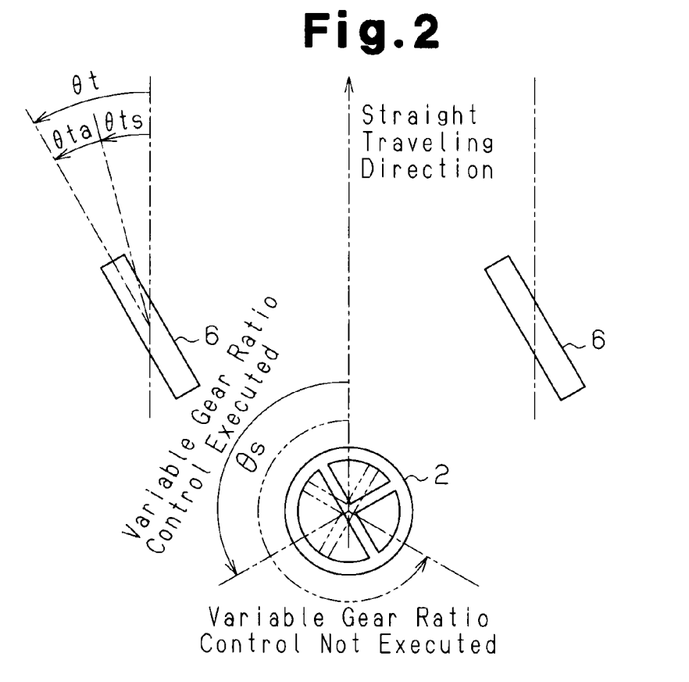
FIG. 2 is an explanatory diagram of variable gear ratio control executed in the steering apparatus of FIG. 1.
Figure 3:
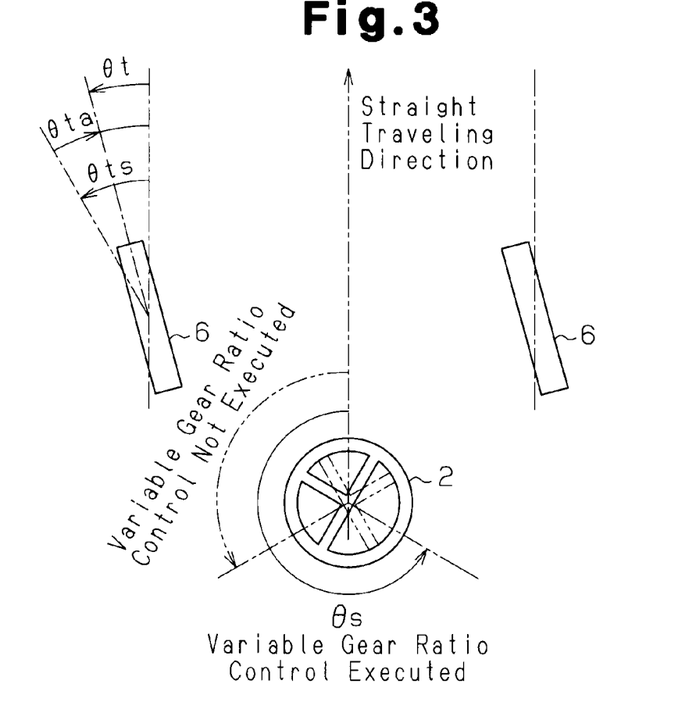
FIG. 3 is an explanatory diagram of variable gear ratio control executed in the steering apparatus of FIG. 1.

Referring to FIGS. 2 and 3, the variable gear ratio actuator 7 "superimposes" a steering angle of the steered wheels 6 produced by driving the motor (ACT angle θta) on a steering angle of the steered wheels 6 produced by the steering operation (basic steering angle θts) so as to vary the proportion of the tire angle θt of the steered wheels 6 to the steering wheel turning angle θs, that is, the transmission ratio (gear ratio). The IFS ECU 8 controls the variable gear ratio actuator 7 by controlling the actuation of the motor 12. Thus, the IFS ECU 8 varies the gear ratio by controlling the ACT angle θta (variable gear ratio control).

In this case, to "superimpose" includes not only to add but also to subtract. When the gear ratio of the tire angle θt to the steering wheel turning angle θs is expressed with an overall gear ratio (θs/θt), the overall gear ratio is reduced by superimposing the basic steering angle θts on the ACT angle θta that is in the same direction as the basic steering angle θts (refer to FIG. 2 in which the tire angle θt is large). The overall gear ratio is increased by superimposing the ACT angle θta that is in the opposite direction (refer to FIG. 3, in which the tire angle θt is small). In the preferred embodiment, the basic steering angle θts corresponds to a first steering angle, and the ACT angle θta corresponds to a second steering angle.

Also, as shown in FIG. 1, the steering apparatus 1 includes an electric power steering (EPS) actuator 17 and an EPS ECU 18. The EPS actuator 17 applies an assist force to the steering system to assist the steering operation performed by a driver. The EPS actuator 17 corresponds to a steering force assist device. The EPS ECU 18 functions as control means for controlling operation of the EPS actuator 17.

The EPS actuator 17 is a rack assist type EPS actuator, in which a motor 22 is provided on the rack 5. The motor 22 functions as a driving source of the EPS actuator 17. An assist torque generated by the motor 22 is transmitted to the rack 5 via a ball screw mechanism (not shown). The EPS ECU 18 controls the assist torque generated by the motor 22 to control the assist force applied to the steering system (power assist control).

The IFS ECU 8, which controls the variable gear ratio actuator 7, and the EPS ECU 18, which controls the EPS actuator 17, are connected to each other via an in-vehicle network 23, or a controller area network (CAN). Sensors for detecting vehicle-condition parameters are connected to the in-vehicle network 23. More specifically, the in-vehicle network 23 is connected to a steering wheel turning angle sensor 24, a torque sensor 25, vehicle wheel speed sensors 26a, 26b, a lateral acceleration (lateral G) sensor 28, a vehicle velocity sensor 29, a brake sensor 30, and a yaw rate sensor 31. The vehicle-condition parameters, namely, a steering wheel turning angle θs, a steering torque τ, wheel speeds Vtr, Vtl, a tire angle θt, a slip angle θsp, a vehicle velocity V, a brake signal Sbk, and a yaw rate Ry are obtained based on signals detected by the sensors 24, 25, 26a, 26b, and 28 to 31, and the parameters are input to the IFS ECU 8 and the EPS ECU 18 via the in-vehicle network 23.

Also, the tire angle θt is obtained by superimposing the ACT angle θta on a value obtained by multiplying the steering wheel turning angle θs by a base gear ratio of the rack and pinion mechanism 4, that is, the basic steering angle θts. The slip angle θsp is obtained based on the lateral acceleration detected by the lateral G sensor 28 and the yaw rate Ry. The IFS ECU 8 and the EPS ECU 18 transmit and receive parameters of vehicle state quantities and control signals by communicating with each other via the in-vehicle network 23, and perform the variable gear control and the power assist control in an integrated way based on the parameters and the control signals.

The electrical configuration and control executed in the steering apparatus 1 according to the preferred embodiment will now be described.

Figure 4:
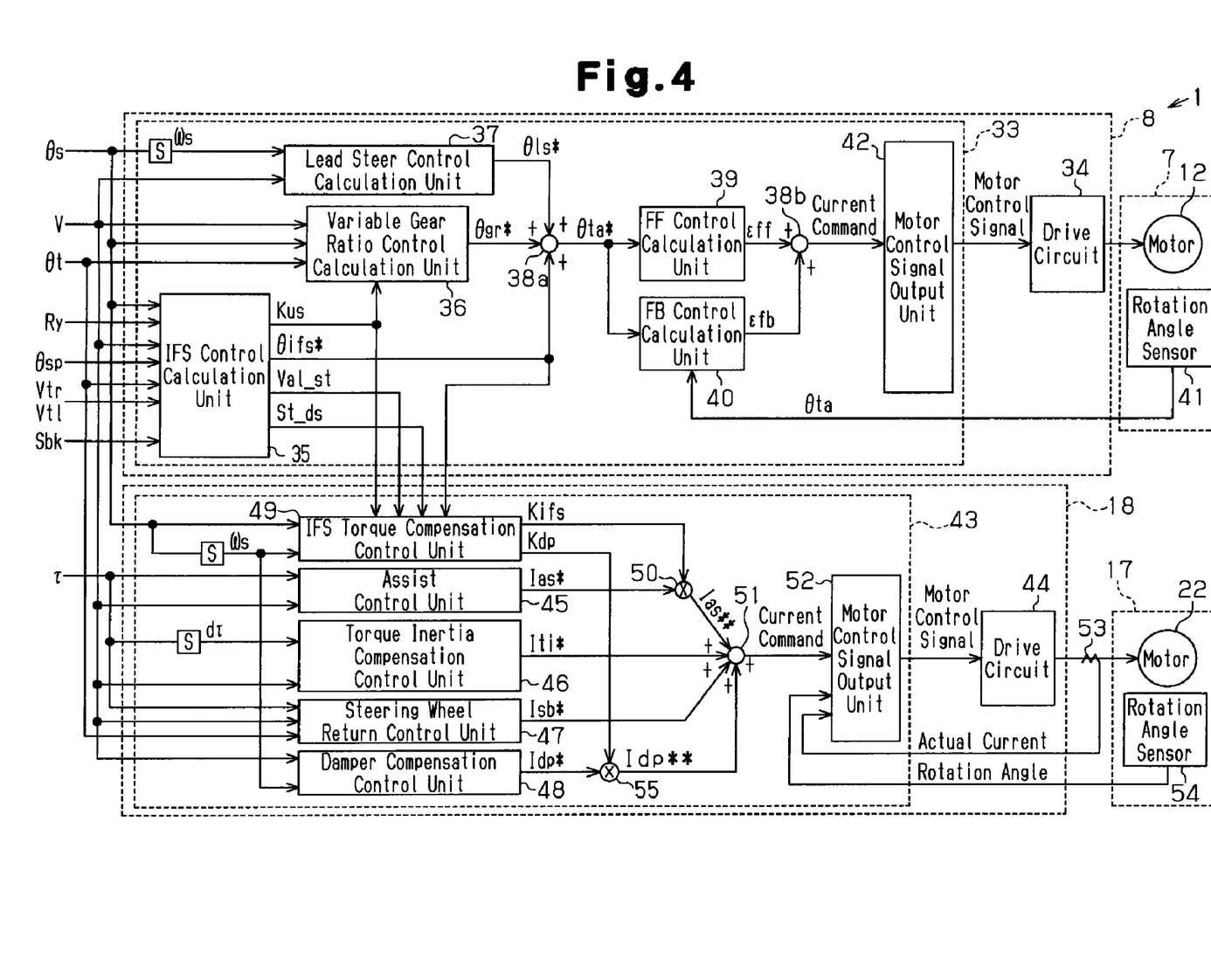
FIG. 4 is a control block diagram of the steering apparatus of FIG. 1.

FIG. 4 is a control block diagram of the steering apparatus 1. As shown in FIG. 4, the IFS ECU 8 includes a microcomputer 33 and a drive circuit 34. The microcomputer 33 outputs a motor control signal. The drive circuit 34 supplies the motor 12 with driving power based on the motor control signal.

In the preferred embodiment, the motor 12, which is a driving source of the variable gear ratio actuator 7, is a brushless motor. The drive circuit 34 supplies the motor 12 with three-phase (U, V, W) driving power based on the motor control signal input from the microcomputer 33.

The microcomputer 33 includes an IFS control calculation unit 35, a variable gear ratio control calculation unit 36, and a Lead Steer control calculation unit 37. Also, the microcomputer 33 includes an FF control calculation unit 39, an FB control calculation unit 40, an adder 38a, and a motor control signal output unit 42. The control calculation units 35-36 calculate control components and control signals of the ACT angle θta based on the input vehicle condition parameters. The microcomputer 33 generates a motor control signal for controlling the motor 12, that is, the actuation of the variable gear ratio actuator 7 based on the calculated control components.

The IFS control calculation unit 35 receives the steering wheel turning angle θs, the tire angle θt, the vehicle velocity V, the wheel speeds Vtr, Vtl, the brake signal Sbk, the yaw rate Ry, and the slip angle θsp. The IFS control calculation unit 35 calculates a control component of the ACT angle θta and a control signal (IFS control calculation) based on the vehicle condition parameters θs, θt, V, Vtr, Vtl, Sbk, Ry, θsp to achieve an active steering function. In this manner, the IFS control calculation unit 35 controls the yaw moment of the vehicle on the vehicle model.

More specifically, the IFS control calculation unit 35 determines the steering characteristic of the vehicle based on the input vehicle condition parameters. The IFS control calculation unit 35 calculates an IFS_ACT command angle θifs* and a US control gain Kus, which serve as the control components of the ACT angle θta. The ACT angle θta is used for the active steering function in accordance with the steering characteristic.

The IFS_ACT command angle θifs* is the control component that mainly corresponds to a case where the steering characteristic of the vehicle is oversteer (OS). Based on the IFS_ACT command angle θifs*, oversteer control is executed that changes the ACT angle θta to apply a steering angle (countersteer) in a direction opposite to the direction of the yaw moment. The US control gain Kus is a control gain that reduces the amount of change of the tire angle θt corresponding to steering operation, or reduces the actual steered angle of the steered wheels 6 when the steering characteristic is understeer (US) The US control gain Kus is output to the variable gear ratio control calculation unit 36. The variable gear ratio control calculation unit 36 reduces the absolute value of the control component based on the US control gain Kus. In this manner, the above mentioned understeer control is executed.

In the present embodiment, the IFS_ACT command angle θifs* and the US control gain Kus are sent as control signals to the EPS ECU 18, together with an OS/US characteristic value Val_st representing the result of the steering characteristic determination and a driver steering state St_ds generated in the IFS control calculation unit 35. The driver steering state St_ds is expressed by an analog value, which continuously change in accordance with the manipulation direction and the manipulation amount of the steering wheel 2. More specifically, the manipulation direction of the steering wheel 2 ("steering" or "steering return") is represented by signs (positive/negative), and the manipulation amount is represented by the absolute value. Based on these control signals, the EPS ECU 18 executes the power assist control, which acts in cooperation with the active steering control.

The variable gear ratio control calculation unit 36 receives the steering wheel turning angle θs, the tire angle θt and the vehicle velocity V. Based on these vehicle-condition parameters and the control signals, the variable gear ratio control calculation unit 36 computes a variable gear ratio ACT command angle θgr* as a control component for changing the gear ratio in accordance with the vehicle velocity V (variable gear ratio control calculation).

The Lead Steer control calculation unit 37 receives the vehicle velocity V and the steering wheel turning speed ωs. The steering wheel turning speed ωs is calculated by differentiating the steering wheel turning angle θs. Based on the vehicle velocity V and the steering wheel turning speed ωs, the Lead Steer control calculation unit 37 computes an LS_ACT command angle θls* as a control component for improving the response of the vehicle in accordance with the steering wheel turning speed.

The IFS control calculation unit 35, the variable gear ratio control calculation unit 36, and the Lead Steer control calculation unit 37 output the calculated control components θifs*, θgr*, θls* to the adder 38a. The adder 38a superimposes the IFS_ACT command angle θifs*, the variable gear ratio ACT command angle θgr*, and the LS_ACT command angle θls* on one another to calculate the ACT command angle θta*, which serves as the control target of the ACT angle θta.

The ACT command angle θta* calculated by the adder 38a is input to the FF control calculation unit 39 and the FB control calculation unit 40. The FB control calculation unit 40 receives the ACT angle θta detected by a rotation angle sensor 41 provided in the motor 12. The FF control calculation unit 39 calculates a control amount εff through feedforward calculation based on the input ACT command angle θta*. The FB control calculation unit 40 calculates a control amount εfb through feedback calculation based on the ACT command angle θta* and the ACT angle θta.

The FF control calculation unit 39 and the FB control calculation unit 40 output their calculated control amounts εff and εfb to an adder 38b. The adder 38b superimposes the control amount εff and the control amount εfb on each other. The calculation result is output to the motor control signal output unit 42 as a current command. The motor control signal output unit 42 generates a motor control signal based on the input current command, and outputs the motor control signal to the drive circuit 34.

Processes executed by the IFS ECU 8 will now be described with reference to FIG. 5.

Figure 5:
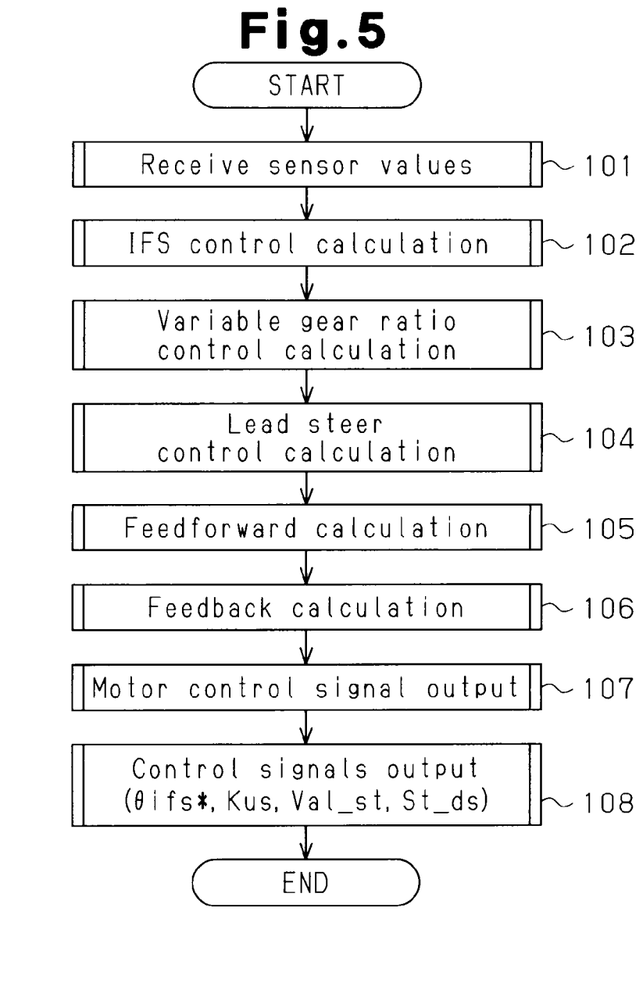
FIG. 5 is a flowchart showing a calculation process executed by the IFS ECU.

As shown in FIG. 5, the microcomputer 33 receives sensor values from the sensors as vehicle-condition parameters (step 101). The microcomputer 33 first executes the IFS control calculation (step 102), and then executes the variable gear ratio control calculation (step 103) and the Lead Steer control calculation (step 104). The microcomputer 33 superimposes the IFS_ACT command angle θifs*, the variable gear ratio ACT command angle θgr*, and the LS_ACT command angle θls*, which are calculated by executing the calculation processes of steps 102 to 104, on one another to calculate a control target of the ACT angle θta, which is the ACT command angle θta*.

The microcomputer 33 performs the feedforward calculation (step 105) and the feedback calculation (step 106) based on the calculated ACT command angle θta* to calculate a current command. The microcomputer 33 outputs a motor control signal based on the current command (step 107). The microcomputer 33 outputs the control signals, namely, IFS_ACT command angle θifs*, the US control gain Kus, the OS/US characteristic value Val_st, and the driver steering state St_ds to the EPS ECU 18 via the in-vehicle network 23 (step 108).

The control block diagram of EPS ECU 18 will now be described.

Like the IFS ECU 8, the EPS ECU 18 also includes a microcomputer 43 and a drive circuit 44 as shown in FIG. 4. In the preferred embodiment, the motor 22, which is the driving source of the EPS actuator 17, is also a brushless motor. The drive circuit 44 supplies the motor 22 with three-phase (U, V, W) driving power based on the motor control signal input from the microcomputer 43.

The microcomputer 43 includes an assist control unit 45, a torque inertia compensation control unit 46, a steering wheel return control unit 47, and a damper compensation control unit 48. These control units 45-48 calculate control components of an assist torque generated by the motor 22 based on input vehicle condition parameters.

In detail, the assist control unit 45 receives the steering torque τ and the vehicle velocity V. The assist control unit 45 calculates a basic assist current command Ias* as a control component that serves as a basis of the assist force based on the steering torque τ and the vehicle velocity V. More specifically, the greater the absolute value of the steering torque τ, and the lower the vehicle velocity V, the greater the basic assist current command Ias* becomes.

Also, the torque inertia compensation control unit 46 receives a steering torque differential value dτ, which is a differential value of the steering torque τ, and the vehicle velocity V. The torque inertia compensation control unit 46 calculates an inertia compensation current command Iti* as a control component for compensating for the influence of the inertia of the EPS actuator 17.

"Torque inertia compensation control" is a control for suppressing "catching feeling (response lag)" at a time of "starting turning" in the steering operation, and "carried-away feeling (overshoot)" at a time of "finishing turning" caused by the inertia of the motor, the actuator, and the like. The torque inertial compensation control also suppresses vibration generated in the steering system.

The steering wheel return control unit 47 receives the vehicle velocity V, the steering torque τ, and the tire angle θt. Based on the parameters V, τ, θt, the steering wheel return control unit 47 calculates a steering wheel return current command Isb*, which is a control component for improving the return characteristic of the steering wheel 2.

The damper compensation control unit 48 receives the vehicle velocity V and the steering wheel turning speed ωs. Based on these parameters ωs, V, the damper compensation control unit 48 computes a damper compensation current command Idp*, which is a compensation component for attenuating the steering wheel turning speed ωs. This control using the damper compensation component improves the steering characteristic. Mainly, an excessive steering angle at high speed driving is suppressed.

Figure 7:
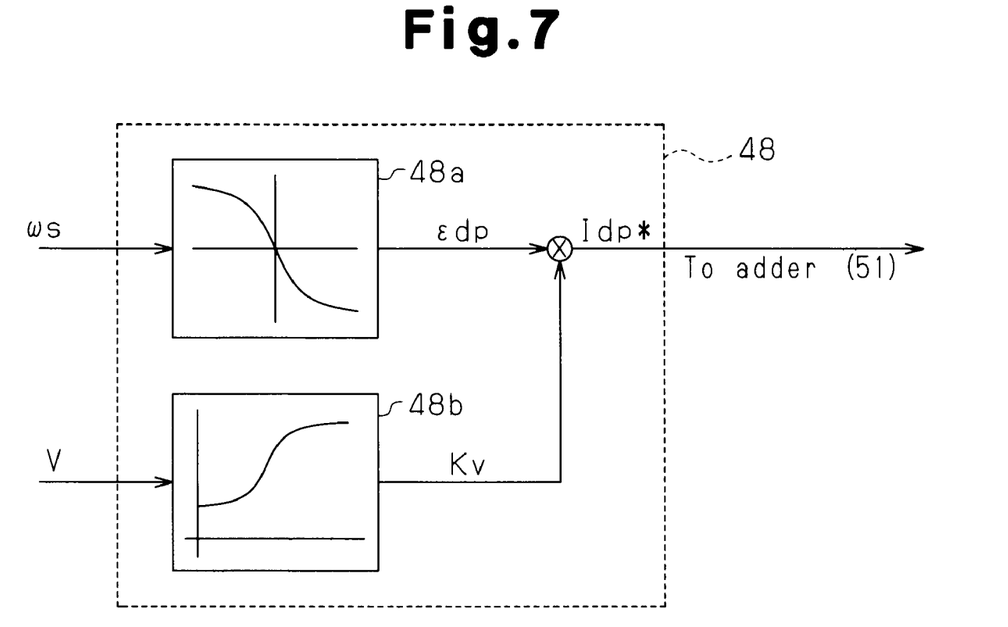
FIG. 7 is a control block diagram of the damper compensation control unit of FIG. 4.

More specifically, as shown in FIG. 7, the damper compensation control unit 48 is provided with a first map 48a associating the steering wheel turning speed ωs and a basic compensation amount εdp, and a second map associating the vehicle velocity V with a vehicle velocity gain Kv. In the first map 48a, the abscissa axis represents the steering wheel turning speed ωs, and the ordinate axis represents the basic compensation amount εdp. The basic compensation amount εdp is set such that the greater the absolute value of the steering wheel turning speed ωs, the greater the degree of attenuation of the steering wheel turning speed ωs becomes. Similarly, in the second map 48b, the abscissa axis represents the vehicle velocity V, and the ordinate axis represents the vehicle velocity gain Kv. The greater the vehicle speed V, the greater the vehicle velocity gain Kv becomes. The damper compensation control unit 48 calculates the damper compensation current command Idp* by multiplying the basic compensation amount εdp based on the first map 48a by the vehicle velocity gain Kv based on the second map 48b.

Referring back to FIG. 4, the microcomputer 43 includes an IFS torque compensation control unit 49, in addition to the above described control units 45 to 48. The IFS torque compensation control unit 49 calculates an IFS torque compensation gain Kifs for executing the power assist control, which is executed in cooperation with the active steering control, to improve the steering feel during the active steering control.

The IFS torque compensation control unit 49 receives, together with the steering wheel turning angle θs and the steering wheel turning speed ωs, the control signals output from the IFS ECU 8, namely, the IFS_ACT command angle θifs*, the US control gain Kus, the OS/US characteristic value Val_st, and the driver steering state St_ds via the in-vehicle network 23. The IFS torque compensation control unit 49 calculates the IFS torque compensation gain Kifs based on the input vehicle condition parameters and the control signals.

Specifically, during oversteer, the IFS torque compensation control unit 49 calculates the IFS torque compensation gain Kifs, which executes application of an assist force that encourages the driver to countersteer. In contrast, during understeer, the IFS torque compensation control unit 49 computes the IFS torque compensation gain Kifs that executes application of an assist force that suppresses increase of the steering wheel turning angle.

The IFS torque compensation gain Kifs calculated by the IFS torque compensation control unit 49 is input to a multiplier 50 together with the basic assist current command Ias* calculated by the assist control unit 45.

When the multiplier 50 multiplies the current command Ias* by the IFS torque compensation gain Kifs, the corrected basic assist current command Ias is calculated. The basic assist current command Ias is input to an adder 51 together with other compensation components, namely, the inertia compensation current command Iti*, the steering wheel return current command Isb*, and the damper compensation current command Idp* (Idp**). The adder 51 calculates a current command, which is a control target of the assist torque generated by the motor 22, by superimposing the control components Iti*, Isb*, and Idp* on the basic assist current command Ias**.

The current command calculated by the adder 51 is input to a motor control signal output unit 52. The motor control signal output unit 52 receives the actual current detected by a current sensor 53 and the rotation angle detected by a rotation angle sensor 54. The motor control signal output unit 52 generates a motor control signal by performing feedback control based on the current command, the actual current, and the rotation angle, and outputs the motor control signal to the drive circuit 44.

Processes executed by the EPS ECU 18 will now be described with reference to FIG. 6.

Figure 6:
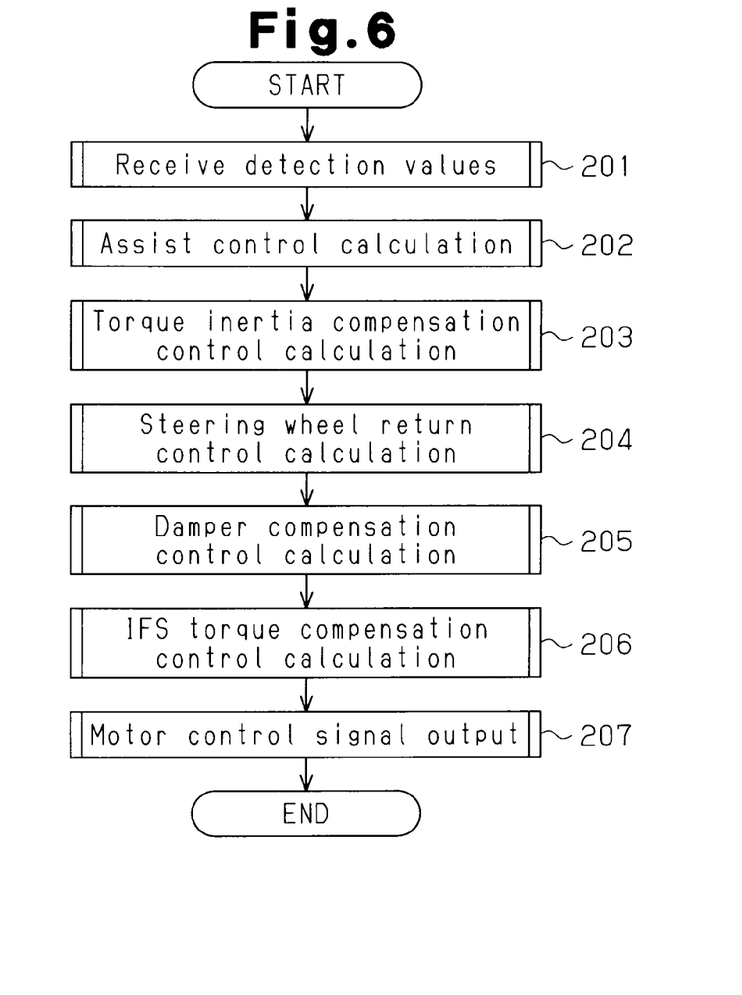
FIG. 6 is a flowchart showing a calculation process executed by the EPS ECU.

As shown in FIG. 6, the microcomputer 43 receives detection values from the sensors as the vehicle-condition parameters (step 201), and first performs the assist control calculation (step 202). Then, the microcomputer 43 performs the torque inertia compensation control calculation (step 203), the steering wheel return control calculation (step 204), and the damper compensation control calculation (step 205), and subsequently performs the IFS torque compensation control calculation (step 206).

Then, in step 207, the microcomputer 43 corrects the basic assist current command Ias* by multiplying the basic assist current command Ias*, which has been calculated by the assist control calculation in step 202, by the IFS torque compensation gain Kifs calculated in step 206. The microcomputer 43 superimposes the corrected basic assist current command Ias** on the inertia compensation current command Iti*, the steering wheel return current command Isb*, and the damper compensation current command Idp* calculated in step 203 to step 205 so as to calculate the current command, which serves as the control target, and outputs the motor control signal based on the current command.

(Variable Damper Compensation Control)

Next, the variable damper compensation control in the steering apparatus 1 will be described.

Generally, the damper compensation control, which attenuates the steering wheel turning speed ωs, can hamper a quick countersteering performed by the driver. Particularly, during the active steering control, in addition to the attenuation by the damper compensation control, the reaction force torque accompanying the actuation of the variable gear ratio actuator 7 can further deteriorate the steering feel of the driver.

Taking this into consideration, the variable damper compensation control is executed to change the damper compensation control amount based on the vehicle stability and the progress of the active steering control. Specifically, the damper compensation control amount is reduced when the vehicle is unstable, that is, when the probability that the driver will countersteer the steering wheel 2 is high. This facilitates the countersteering. Further, a case will be described in which, as the active steering control, an oversteer control is executed to automatically apply a steering angle (ACT angle θta) in the countersteering direction. When the oversteer control is being stabilized, or converged, that is, when the vehicle attitude is being stabilized by a steering angle in the countersteering direction, the damper compensation control is intensified. This suppresses the generation of excessive countersteering. As a result, a favorable steering feel is ensured, and an appropriate countersteering corresponding to the vehicle stability is performed.

As shown in FIG. 4, the IFS torque compensation control unit 49 of the microcomputer 43 calculates a damper compensation gain Kdp of the variable damper compensation control, in addition to the IFS torque compensation gain Kifs.

The damper compensation gain Kdp calculated by the IFS torque compensation control unit 49 is sent to the multiplier 55 together with the damper compensation current command Idp* calculated by the damper compensation gain Kdp. The multiplier 55 multiplies the damper compensation current command Idp* by the damper compensation gain Kdp to correct the damper compensation current command Idp*, and sends the corrected damper compensation current command Idp to the adder 51. The adder 51 superimposes the damper compensation current command Idp, the basic assist current command Ias**, and other compensation components Iti*, Isb on one another, thereby changing the current command. The damper compensation control amount is thus changed.

The IFS torque compensation control unit 49 will now be described with reference to FIG. 8.

Figure 8:
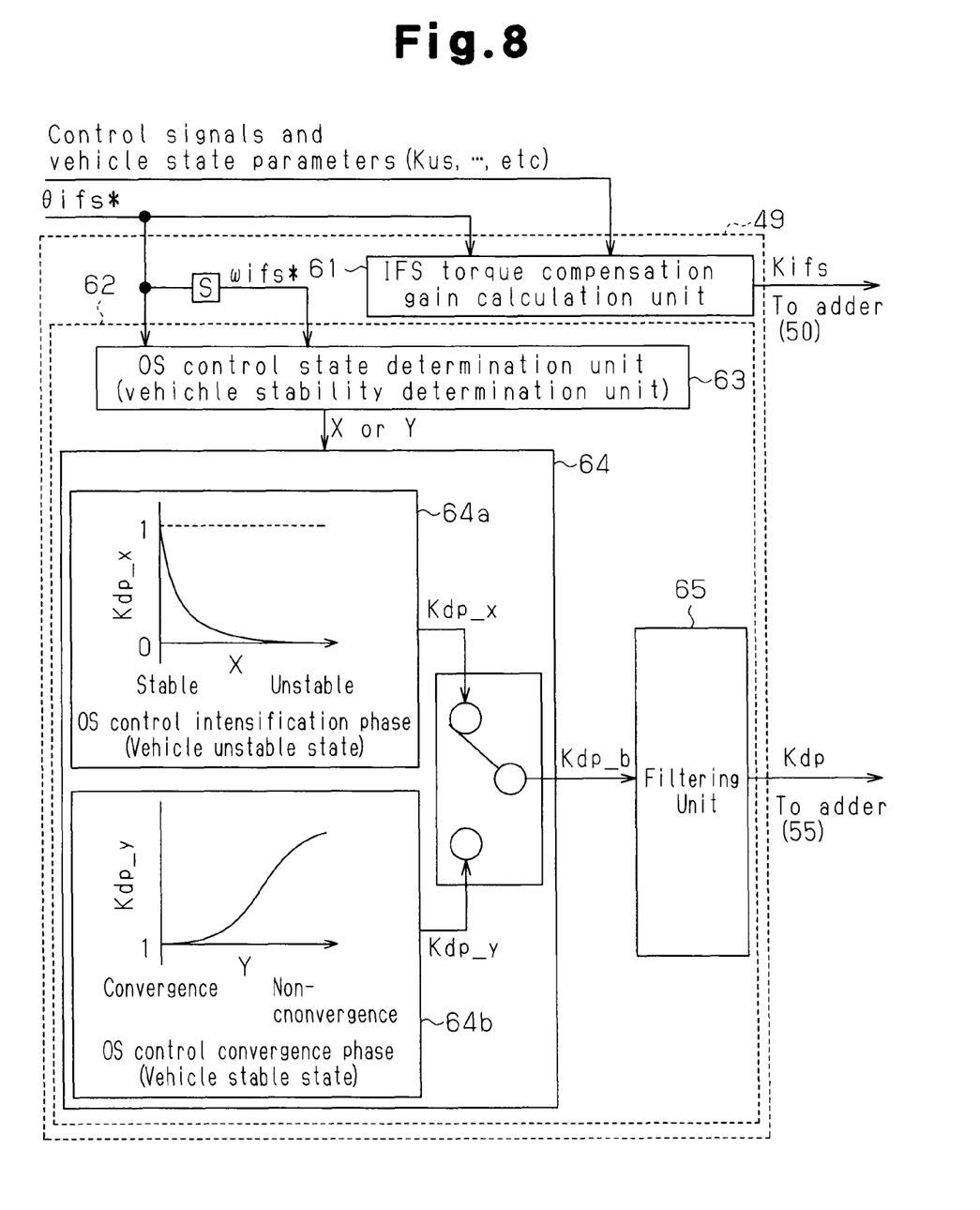
FIG. 8 is a control block diagram of the IFS torque compensation control unit of FIG. 4.

As shown in FIG. 8, the IFS torque compensation control unit 49 includes a damper compensation gain calculation unit 62, in addition to an IFS torque compensation gain calculation unit 61, which calculates the IFS torque compensation gain Kifs. The IFS torque compensation control unit 49 outputs the damper compensation gain Kdp calculated by the damper compensation gain calculation unit 62 to the multiplier 55.

Specifically, the damper compensation gain calculation unit 62 has an OS control state determination unit 63 (vehicle stability determination unit), which determines the state of oversteer (OS) control. While executing the oversteer control (OS control), the OS control state determination unit 63 determines whether the state of the OS control is in a state where the ACT angle θta in the countersteering direction should be increased (OS control intensification state), or in a state where the ACT angle θta in the countersteering direction should be converged with zero (the OS control convergence state). Based on the determination result in the OS control state determination unit 63, the damper compensation gain Kdp is calculated.

The OS control state determination unit 63 receives the IFS_ACT command angle θifs*, and an IFS_ACT command angular velocity ωifs*, which is a differential value of the IFS_ACT command angle θifs*. The IFS_ACT command angle θifs* is a control component of the ACT angle θta that should be generated during the OS control. Based on the IFS_ACT command angle θifs* and the IFS_ACT command angular velocity ωifs*, the OS control state determination unit 63 determines whether the currently executed oversteer control is being intensified or converged.

Next, an OS control state determination process executed by the OS control state determination unit 63 will be described with reference to the flowchart of FIG. 9.

Figure 9:
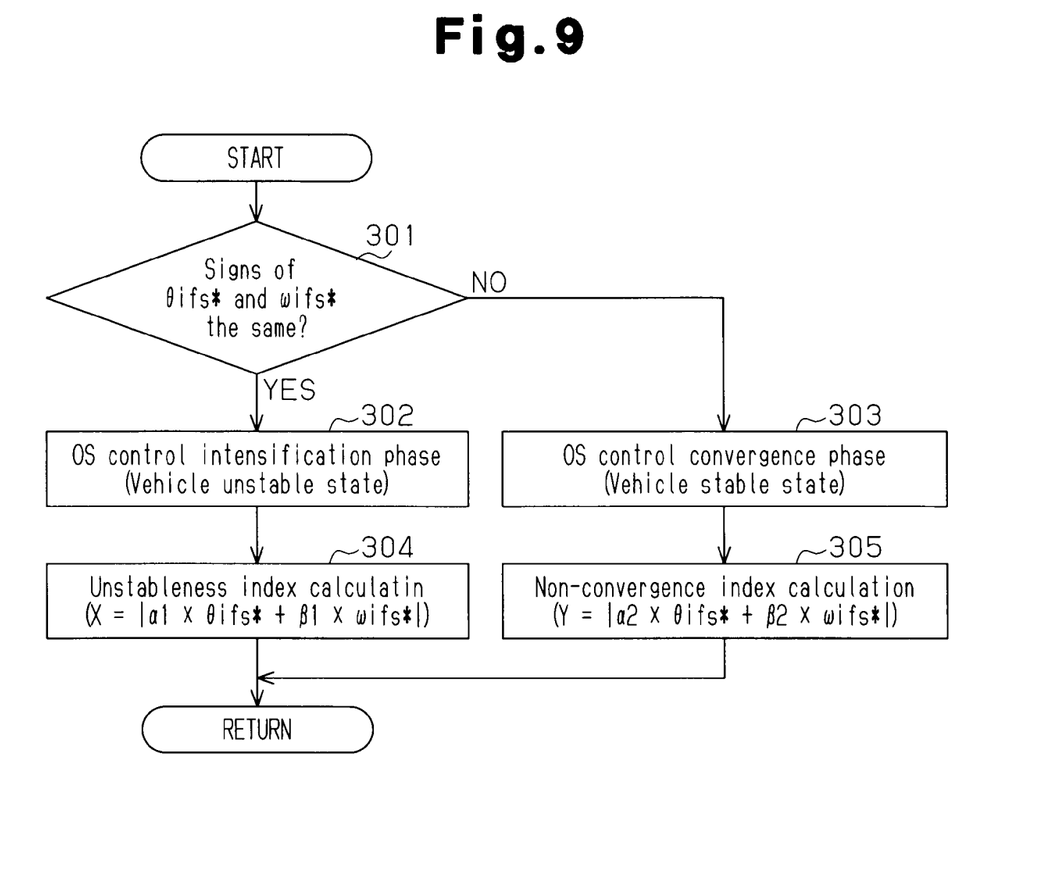
FIG. 9 is a flowchart showing an OS control state determination process executed by the OS control determination unit of FIG. 8.

As shown in FIG. 9, the OS control state determination unit 63 determines whether the sign of the IFS_ACT command angle θifs* is the same as the sign of the IFS_ACT command angular velocity ωifs* (step 301). The IFS_ACT command angle θifs* represents the angular position of the motor 12, that is, the control direction of the motor 12. In the present embodiment, when the IFS_ACT command angle θifs* has a positive value, the motor 12 is actuated in the clockwise direction. When the IFS_ACT command angle θifs* has a negative value, the motor 12 is actuated in the counterclockwise direction. The IFS_ACT command angular velocity ωifs* represents the angular velocity of the IFS_ACT command angle θifs*. When the IFS_ACT command angular velocity ωifs* has a positive value, the motor 12 is being accelerated in clockwise direction, and when the IFS_ACT command angular velocity ωifs* has a negative value, the motor 12 is being decelerated in clockwise direction. The actuation directions of the motor 12 defined by the sign of the IFS_ACT command angle θifs* may be reversed.

When the sign of the IFS_ACT command angle θifs* is the same as the sign of the IFS_ACT command angular velocity ωifs* (step 301: YES), the OS control state determination unit 63 determines that the OS control is being intensified (step 302). In contrast, when the signs the values (θifs*, ωifs*) are different from each other (step 301: NO), the OS control state determination unit 63 determines that OS control is being converged (step 303).

In other words, the determination of whether the values (θifs*, ωifs*) have the same sign equates to the determination of whether the absolute value of the IFS_ACT command angle θifs* is increasing. If the absolute value of the IFS_ACT command angle θifs* is increasing, the OS control state determination unit 63 determines that the OS control is in the intensification state. If the absolute value of the IFS_ACT command angle θifs* is decreasing, the OS control state determination unit 63 determines that the OS control is in the convergence state.

Also, in accordance with the result of the determination on the OS control, the OS control state determination unit 63 calculates an index for evaluating the state (intensification state or convergence state). Specifically, when the OS control is in the intensification state (step 301: YES, step 302), the OS control state determination unit 63 calculates an unstableness index X indicating the degree of unstableness of the vehicle attitude at the time (step 304). In contrast, when the OS control is in the convergence state (step 301: NO, step 303), the OS control state determination unit 63 calculates a control non-convergence index Y indicating the degree of convergence of the OS control (step 305).

The unstableness index X and the control non-convergence index Y correspond to a parameter that indicates the degree of stableness of the vehicle. The greater the value of the unstableness index X, the more unstable the vehicle attitude becomes. In contrast, the greater the value of the control non-convergence index Y, the less the degree of convergence of the OS control becomes.

The OS control state determination unit 63 calculates the unstableness index X and the control non-convergence index Y using the following expressions.

The coefficients α1, α2, β1, β2 in the expressions (1) and (2) are predetermined constant.

$$X = |\alpha 1 \times \theta ifs^* + \beta 1 \times \omega ifs^*| \tag{1}$$

$$Y = |\alpha 2 \times \theta ifs^* + \beta 2 \times \omega ifs^*| \tag{2}$$

According to the expression (1), in the OS control intensification state, the greater the IFS_ACT command angle θifs* and the greater the IFS_ACT command angular velocity ωifs*, the greater the value of the unstableness index X and the less stable the vehicle is determined to be. Specifically, when the IFS_ACT command angle θifs* is great, it is indicated that a greater ACT angle θta in the countersteering direction needs to be generated. Also, when the IFS_ACT command angular velocity ωifs* is great, the IFS_ACT command angle θifs* is increasing in the countersteering direction at a greater speed. In other words, when the vehicle is in the oversteer state, the unstableness index X indicates the speed at which the oversteer state progresses.

Therefore, the greater the value of the unstableness index X, the greater the estimated speed of the progress of the oversteer state becomes. In this state, the vehicle is likely to spin. To stabilize the attitude of the vehicle, the amount and the speed of the oversteer control are increased. Thus, by monitoring the parameters θifs* and ωifs*, the stability of the vehicle is accurately determined.

According to the expression (2), in the OS control convergence state, the greater the excessive IFS_ACT command angle θifs*, the greater the value of the control non-convergence index Y, and the lower the determined degree of convergence of the OS control becomes.

As described above, the OS control state determination unit 63 functions as determination means that determines the stability of the vehicle, and also as determination means that determines the degree of convergence of the OS control. The damper compensation gain calculation unit 62 calculates the damper compensation gain Kdp for the damper compensation control based on the unstableness index X or the control non-convergence index Y calculated as the result of the OS control state determination.

Referring back to FIG. 8, the damper compensation gain calculation unit 62 includes a map calculation unit 64, which has first and second maps 64a, 64b, which correspond to the OS control intensification state and the OS control convergence state, respectively. The unstableness index X or the control non-convergence index Y, which are calculated by the OS control state determination unit 63, are sent to the map calculation unit 64. Based on the received unstableness index X or control non-convergence index Y, the map calculation unit 64 calculates a basic gain Kdp_b, which is the base of the damper compensation gain Kdp.

The configuration of the map calculation unit 64 will now be discussed.

The first map 64a shown in FIG. 8 is a map for the OS control intensification state. In the first map 64a, an intensification state gain Kdp_x and the unstableness index X are associated with each other. The intensification state gain Kdp_x is set to a value that reduces the damper compensation current command Idp*, that is, to a value less than or equal to one. In the first map 64a, the greater the value of the unstableness index X, that is, the less stable the vehicle, the less (the closer to zero) the value of the intensification state gain Kdp_x becomes.

The map calculation unit 64 receives the unstableness index X from the damper compensation gain calculation unit 62, and calculates the intensification state gain Kdp_x using the first map 64a. Specifically, the map calculation unit 64 calculates the intensification state gain Kdp_x to have such value that the greater the unstableness index X, that is, the lower the stability of the vehicle, the more decreased the damper compensation current command Idp* becomes.

In contrast, the second map 64b is used for the OS control convergence state. In the second map 64b, a convergence state gain Kdp_y and the control non-convergence index Y are associated with each other. The convergence state gain Kdp_y is set to a value that increases the damper compensation current command Idp*, that is, to a value greater than or equal to one. In the second map 64b, the greater the control non-convergence index Y, that is, the shorter the elapsed time from the start of the OS control convergence state, the greater the value of the convergence state gain Kdp_y becomes.

The map calculation unit 64 receives the control non-convergence index Y from the damper compensation gain calculation unit 62, and calculates the convergence state gain Kdp_y using the second map 64b. Specifically, the second map calculation unit 64 calculates the convergence state gain Kdp_y to such a value that the greater the control non-convergence index Y, that is, the less time from the start of the OS control convergence state has elapsed, the greater the damper compensation current command Idp* becomes.

As described above, in response to input from the OS control state determination unit 63, the map calculation unit 64 outputs, as the basic gain Kdp_b, either the intensification state gain Kdp_x or the convergence state gain Kdp_y.

Specifically, in the OS control intensification state, in which the vehicle is unstable, it is preferable that the driver quickly perform countersteering, in addition to the oversteer control. The lower the vehicle stability, the more important the countersteering becomes. In this regard, in the present embodiment, the lower the vehicle stability, the more reduced the damper compensation current command Idp*. This allows the driver to quickly perform countersteering. As a result, the driver appropriately performs countersteering.

On the other hand, in the OS control convergence state, in which the vehicle attitude is being stabilized by the generated steering angle in the countersteering direction, an excessive countersteering by the driver can destabilize the vehicle attitude. In an earlier stage of the OS control convergence state in which the steering angle in the countersteering direction (ACT angle θta) has a greater value, the influence of an excessive countersteering is great. Taking this into consideration, in the present embodiment, the shorter the time elapsed from the start of the OS control convergence state, the greater the value of the damper compensation current command Idp*. This suppresses the generation of excessive countersteering. As a result, the vehicle attitude is prevented from being unstable, and the OS control is quickly converged.

In the present embodiment, the thus calculated basic gain Kdp_b is output from the map processing unit 64. After performing filtering of the basic gain Kdp_b (low pass filtering), the filter processing unit 65 of the damper compensation gain calculation unit 62 outputs the damper compensation gain Kdp. The damper compensation gain Kdp is output from the IFS torque compensation control unit 49 to the multiplier 55 (see FIG. 4). The damper compensation gain Kdp is multiplied by the damper compensation current command Idp*, so that the damper compensation current command Idp** is increased or decreased.

The steering apparatus according to the present embodiment has the following advantages.

(1) The microcomputer 43 of the EPS ECU 18 has the OS control state determination unit 63, which functions as determination means determining the vehicle stability. In the OS control intensification state, in which the vehicle stability is low, the microcomputer 43 reduces the damper compensation current command Idp* (Idp**), which is a damper compensation component for attenuating the steering wheel turning speed ωs.

Specifically, in the OS control intensification state, in which the vehicle is unstable, it is preferable that the driver quickly perform countersteering, in addition to the oversteer control. The steering apparatus 1 of the present embodiment abates the damper compensation control for attenuating the steering wheel turning speed ωs, thereby facilitating a quick countersteering. As a result, when the driver appropriately performs countersteering, the vehicle attitude is quickly stabilized. In addition to the attenuation achieved by the damper compensation control, the discomfort caused by addition of the motor reaction force during the oversteer control is suppressed. Accordingly, a favorable steering feel is ensured.

(2) The lower the vehicle stability, the greater the degree of decrease of the damper compensation current command Idp* (Idp**) made by the microcomputer 43 becomes.

Specifically, the lower the vehicle stability, the more important the countersteering performed by the driver becomes. In the steering apparatus 1 according to the present embodiment, the more important the countersteering, the easier the performance of a quick countersteering becomes. As a result, the driver is effectively urged to perform an appropriate countersteering, and the vehicle attitude is quickly stabilized.

(3) In the OS control convergence state, the microcomputer 43 increases the damper compensation current command Idp* (Idp**).

Specifically, in the OS control convergence state, in which the vehicle attitude has been stabilized by the generated steering angle in the countersteering direction, an excessive countersteering by the driver can destabilize the vehicle attitude. However, the steering apparatus 1 of the present embodiment intensifies the damper compensation for attenuating the steering wheel turning speed ωs, thereby suppressing the generation of excessive countersteering. As a result, the vehicle attitude is prevented from being unstable due to excessive countersteering, and the oversteer control is quickly converged. As a result, the steering apparatus 1 is quickly returned to the normal control.

(4) The shorter the time elapsed from the start of the OS control convergence state, the greater the compensation current command Idp* the microcomputer 43 makes.

Specifically, in an earlier stage of the OS control convergence state, in which the steering angle in the countersteering direction (ACT angle θta) has a greater value, the influence of an excessive countersteering is great. In this regard, according to the steering apparatus 1 of the present embodiment, the greater the influence of excessive countersteering, the more effective the suppression of the generation of excessive countersteering becomes.

The present invention may be modified as follows.

As long as the damper compensation component is reduced in a state of a low vehicle stability, the variable gear ratio actuator 7 may be omitted. In this case also, the driver is prompted to perform appropriate countersteering in the low vehicle stability state.

In the illustrated embodiment, the OS control state determination unit 63 determines the OS control state, thereby determining the vehicle stability. However, other configuration may be employed. For example, the OS control state determination and the vehicle stability determination may be executed separately. In that case, for example, when the vehicle is in an oversteer state, the grater the speed of progress of the oversteer state, the lower the determined vehicle stability becomes.

In the illustrated embodiment, the IFS_ACT command angle θifs* and the IFS_ACT command angular velocity ωifs* are used for determining the OS control state (the vehicle stability determination). However, other state parameters may be used. For example, the ACT command angle θta* and its differential value may be used. Also, the ACT angle θta and its differential value may be used. Further, to determine the vehicle stability, the yaw rate Ry and its differential value may be used, and the slip angle θsp and its differential value may be used. In these cases, the vehicle stability is determined by monitoring, for example, increase or decrease of the yaw rate Ry (slip angle θsp). When the yaw rate Ry (slip angle θsp) is increased, the vehicle stability is determined to be low.

In the illustrated embodiment, the unstableness index X and the control non-convergence Y are calculated using the expressions (1), (2), respectively. However, the indexes may be calculated in other ways to determine the degree of the vehicle stability (instability), and the degree of convergence of the OS control.

In the illustrated embodiment, the damper compensation current command Idp* is corrected by being multiplied by the damper compensation gain Kdp, so that the damper compensation current command Idp** is increased or decreased. However, it may be corrected according to other methods. For example, the damper compensation current command Idp* may be corrected by switching calculation maps to increase or decrease the command Idp*.

In the illustrated embodiment, to calculate a current command, the damper compensation current command Idp* (Idp**), which is a damper compensation component, and other compensation components (the inertia compensation current command Iti*, and the steering wheel return current command Isb*) are superimposed on the basic assist current command Ias*(Ias**). However, other compensation components may be employed as long as they are superimposed on the damper compensation component that attenuates the steering wheel turning speed ωs.

The filtering process performed by the filter processing unit of the damper compensation gain calculation unit 62 does not need to be always executed. The filter processing unit 65 may be omitted.

The present examples and embodiments are to be considered as illustrative and not restrictive and the invention is not to be limited to the details given herein, but may be modified within the scope and equivalence of the appended claims.

What is claimed is:

1. A vehicle steering apparatus for changing an angle of a steered wheel of a vehicle steering system in accordance with operation of a steering wheel by a driver, the steering apparatus comprising:
    a steering force assist device for applying an assist force to the steering system to assist the operation of the steering wheel;
    a control means for controlling the steering force assist device with a target assist force, the control means calculating a basic assist component for controlling the steering force assist device, the control means calculating a damper compensation component based on a turning speed of the steering wheel, and the control means calculating the target assist force by superimposing the basic assist component on the damper compensation component; and
    a stability determination means for determining a stability of the vehicle,
    wherein the control means reduces the damper compensation component to correct the target assist force when the stability determination means determines that the stability of the vehicle is relatively low.

2. The steering apparatus according to claim 1,
    wherein, when the vehicle is in an oversteer state, the stability determination means determines the stability of the vehicle based on a parameter corresponding to a speed of progress of an oversteer state of the vehicle, and wherein the greater the speed of progress of the oversteer state, the lower the stability of the vehicle determined by the stability determination means becomes.

3. The steering apparatus according to claim 1,
    wherein the stability determination means calculates a parameter corresponding the stability level of the vehicle, and
    wherein, based on the parameter, the control means controls the damper compensation component such that the lower the stability of the vehicle, the more reduced the damper compensation component becomes.

4. The steering apparatus according to claim 1, further comprising:
    a variable transmission ratio device having a motor for steering the steered wheel, wherein the steering angle of the steered wheel is determined by superimposing a first steering angle based on a turning angle of the steering wheel and a second steering angle based on the activation of the motor on each other, wherein the variable transmission ratio device adjusts the second steering angle, thereby changing the ratio of the steering angle of the steered wheel to the turning angle of the steering wheel, wherein, when the vehicle is in an oversteer state, the variable transmission ratio device changes the second steering angle in a direction that is opposite to the direction of the yaw moment of the vehicle, and wherein the control means reduces the damper compensation component when the vehicle is in the oversteer state in which the variable transmission ratio device changes the second steering angle in a direction that is opposite to the direction of the yaw moment of the vehicle.

5. The steering apparatus according to claim 4, wherein, when the vehicle is in the oversteer state, the stability determination means determines the stability of the vehicle based on a parameter corresponding to the speed of progress of the oversteer state of the vehicle, and wherein the greater the speed of progress of the oversteer state, the lower the stability of the vehicle determined by the stability determination means becomes.

6. The steering apparatus according to claim 4, wherein the stability determination means calculates a parameter corresponding to the stability level of the vehicle, and wherein, based on the parameter, the control means controls the damper compensation component such that the lower the stability of the vehicle, the more reduced the damper compensation component becomes.

7. The steering apparatus according to claim 4, wherein, when the second steering angle is increased in a direction opposite to the present steering angle of the steered wheel with respect to a straight traveling direction of the vehicle during the oversteer control, the stability determination means determines that the vehicle is unstable, and the control means reduces the damper compensation component.

8. The steering apparatus according to claim 4, wherein, when the oversteer control is intensified, the stability determination means determines that the vehicle is unstable, and the control means reduces the damper compensation component.

9. The steering apparatus according to claim 4, wherein, after the oversteer control intensification is terminated and the oversteer control is converging, the control means increases the damper compensation component.

10. The steering apparatus according to claim 9, wherein the control means controls such that the shorter the time elapsed from the time when the oversteer control begins to converge, the more increased the damper compensation component becomes.

11. The steering apparatus according to claim 4, wherein, when the second steering angle increases in the same direction with respect to a traveling direction of the vehicle during the oversteer control, the control means increases the damper compensation component.

* * * * *